United States Patent
Vasudeva

(10) Patent No.: US 11,098,792 B2
(45) Date of Patent: Aug. 24, 2021

(54) TRANSMISSION SYSTEM FOR MACHINE

(71) Applicant: Caterpillar Inc., Peoria, IL (US)

(72) Inventor: Gaurav Vasudeva, Dunlap, IL (US)

(73) Assignee: Caterpillar Inc., Peoria, IL (US)

(*) Notice: Subject to any disclaimer, the term of this patent is extended or adjusted under 35 U.S.C. 154(b) by 24 days.

(21) Appl. No.: 16/587,618

(22) Filed: Sep. 30, 2019

(65) Prior Publication Data

US 2021/0095748 A1  Apr. 1, 2021

(51) Int. Cl.
| | | |
|---|---|---|
| *F16H 47/04* | (2006.01) | |
| *E02F 9/22* | (2006.01) | |
| *E02F 9/20* | (2006.01) | |

(52) U.S. Cl.
CPC .......... *F16H 47/04* (2013.01); *E02F 9/202* (2013.01); *E02F 9/2253* (2013.01); *E02F 9/2296* (2013.01); *F16H 2200/0039* (2013.01); *F16H 2200/0086* (2013.01); *F16H 2200/20* (2013.01); *F16H 2200/201* (2013.01); *F16H 2200/2012* (2013.01); *F16H 2200/2043* (2013.01); *F16H 2702/00* (2013.01)

(58) Field of Classification Search
CPC .. F16H 47/04; F16H 2702/00; F16H 2200/20; F16H 2200/0039; F16H 2200/201; F16H 2200/2012; F16H 2200/2043; E02F 9/2296; E02F 9/2253; E02F 9/202
USPC ................ 475/72, 73, 80, 83, 207, 218, 219
See application file for complete search history.

(56) References Cited

U.S. PATENT DOCUMENTS

| | | | |
|---|---|---|---|
| 3,897,697 A | | 8/1975 | Chambers et al. |
| 4,976,665 A | | 12/1990 | Hagin et al. |
| 5,139,465 A | | 8/1992 | Sato |
| 5,267,911 A | * | 12/1993 | Meyerle .................. F16H 47/04 475/81 |
| 6,080,074 A | * | 6/2000 | Ulbrich .................. F16H 47/04 475/72 |
| 7,357,744 B2 | | 4/2008 | Dyck et al. |
| 7,530,914 B2 | | 5/2009 | Fabry et al. |
| 7,789,795 B2 | | 9/2010 | McKenzie et al. |

(Continued)

FOREIGN PATENT DOCUMENTS

| | | | | |
|---|---|---|---|---|
| EP | 2955418 A1 | * | 12/2015 | ............. F16H 47/04 |
| GB | 2002862 | | 2/1979 | |

(Continued)

*Primary Examiner* — Roger L Pang
(74) *Attorney, Agent, or Firm* — Hibshman Claim Construction PLLC

(57) ABSTRACT

A transmission system for a machine is coupled to an engine of the machine that is adapted to generate power. The transmission system includes a hydraulic power path including a variator coupled to the engine. The transmission system also includes a mechanical power path. The mechanical power path includes a first gear arrangement including a plurality of gears. The mechanical power path also includes a second gear arrangement including a plurality of gears. The second gear arrangement is coupled with the first gear arrangement to receive the variable rotational power from the first gear arrangement. The mechanical power path further includes a first clutch assembly and a second clutch assembly. Further, the second gear arrangement directs the variable rotational power received from the first gear arrangement towards a final output member of the machine in a selected direction.

20 Claims, 4 Drawing Sheets

(56) References Cited

U.S. PATENT DOCUMENTS

| | | | |
|---|---|---|---|
| 9,394,975 B1* | 7/2016 | Calvert | F16H 3/725 |
| 9,488,263 B2 | 11/2016 | Vasudeva et al. | |
| 2013/0068545 A1* | 3/2013 | Cronin | B62D 55/06 |
| | | | 180/9.1 |
| 2020/0217415 A1* | 7/2020 | Beyer | F16H 61/061 |

FOREIGN PATENT DOCUMENTS

| | | |
|---|---|---|
| GB | 2424931 | 10/2006 |
| WO | 2006108109 | 10/2006 |

* cited by examiner

| DIRECTION | SPEED | FIRST CLUTCH | SECOND CLUTCH | THIRD CLUTCH | FOURTH CLUTCH | FIFTH CLUTCH |
|---|---|---|---|---|---|---|
| FORWARD | LOW | X | | X | | |
| | HIGH | | X | X | | |
| | AUXILIARY | | X | | | X |
| REVERSE | LOW | X | | | X | |
| | HIGH | | X | | X | |

*FIG. 4*

TRANSMISSION SYSTEM FOR MACHINE

TECHNICAL FIELD

The present disclosure relates to a transmission system associated with a machine.

BACKGROUND

A machine, such as a track type machine, may include a pair of tracks that allow movement of the machine on a ground surface. Typically, a transmission system is used to propel the machine based on power received from an engine of the machine. The transmission system may enable shifting of the machine between different speeds and directions.

Some track type machines, such as a track type tractor, include a hydromechanical transmission system. The hydromechanical transmission system includes a parallel power path having a hydraulic power path and a mechanical power path to realize the transmission function in the machine. Further, the mechanical power path of such transmission systems includes gear assemblies and clutches that allow selection of different speed ranges based on engagement and disengagement of the clutches. However, such transmission systems are generally bulky and have a complicated design and operation. Further, as such transmission systems include multiple components, an overall manufacturing and operating cost associated with the machine tends to increase. Moreover, such transmission systems generally require dedicated components and subassemblies for different machine platforms.

U.S. Pat. No. 3,897,697 describes a power transmission having an input section with planetary gearing providing a split power path from the input to a pair of idler gears wherein differing drive ratios exist in each branch of the split path. A hydraulic section having coupled variable displacement pump motor units links the two idler gears. By adjusting the displacements, the two idler gears may be constrained to rotate at any selected relative speed within a range of relative speeds and this enables progressive variation of the division of input power between the two branches of the split power path. An output section including additional planetary gearing provides for transmitting of power from either or both of the idler gears to an output means. Drive establishing devices in the input section provide for reversal of drive direction in each branch of the split power path and additional drive establishing devices in the output section provide for a plurality of speed ranges in both forward and reverse in each of which the infinite variation of drive ratio may be repeated. Drive establishing clutches and brakes need engage only under stationary conditions. These characteristics enable a single transmission configuration to be used in a variety of vehicles, of different power ratings, wherein a number of distinctly different transmissions have heretofore been necessary.

SUMMARY OF THE DISCLOSURE

In an aspect of the present disclosure, a transmission system for a machine is provided. The transmission system is coupled to an engine of the machine that is adapted to generate power. The transmission system includes a hydraulic power path including a variator coupled to the engine. The variator receives a portion of the power generated by the engine. The transmission system also includes a mechanical power path. The mechanical power path includes a first gear arrangement including a plurality of gears. The first gear arrangement is coupled with the variator and the engine and is operative to receive power from the variator and the engine. The mechanical power path also includes a second gear arrangement including a plurality of gears. The second gear arrangement is coupled with the first gear arrangement to receive the variable rotational power from the first gear arrangement. The mechanical power path further includes a first clutch assembly being selectively engageable to couple the first gear arrangement and the second gear arrangement. The mechanical power path includes a second clutch assembly being selectively engageable with at least one gear of the second gear arrangement. Further, the second gear arrangement directs the variable rotational power received from the first gear arrangement towards a final output member of the machine in a selected direction.

In another aspect of the present disclosure, a modular transmission kit for a machine is provided. The modular transmission kit is configured to be coupled to an engine of the machine that is adapted to generate power. The modular transmission kit includes a variator coupled to the engine. The variator receives a portion of the power generated by the engine. The modular transmission kit also includes a first gear arrangement including a plurality of gears. The first gear arrangement is coupled with the variator and the engine and operative to receive power from the variator and the engine. The modular transmission kit further includes a second gear arrangement including a plurality of gears. The second gear arrangement is coupled with the first gear arrangement to receive a variable rotational power from the first gear arrangement. Further, the second gear arrangement is configured to direct the variable rotational power in a selected direction. The modular transmission kit further includes a first clutch assembly being selectively engageable to couple the first gear arrangement and the second gear arrangement. The modular transmission kit includes a second clutch assembly being selectively engageable with at least one gear of the second gear arrangement. The modular transmission kit also includes an output module coupled with the second gear arrangement. The output module receives, from the second gear arrangement, the variable rotational power directed in the selected direction. Further, the output module is configured to adapt the variable rotational power directed in the selected direction to a final output member of the machine.

In yet another aspect of the present disclosure, a machine is provided. The machine includes an engine adapted to generate power. The machine also includes a transmission system coupled with the engine. The transmission system includes a hydraulic power path including a variator coupled to the engine. The variator receives a portion of the power generated by the engine. The transmission system also includes a mechanical power path. The mechanical power path includes a first gear arrangement including a plurality of gears. The first gear arrangement is coupled with the variator and the engine and operative to receive power from the variator and the engine. The mechanical power path also includes a second gear arrangement including a plurality of gears. The second gear arrangement is coupled with the first gear arrangement to receive the variable rotational power from the first gear arrangement. Further, the second gear arrangement is configured to direct the variable rotational power in a selected direction. The mechanical power path further includes a first clutch assembly being selectively engagable to couple the first gear arrangement and the second gear arrangement. The mechanical power path includes a second clutch assembly being selectively engagable with at least one gear of the second gear arrangement. The machine further includes a final output member coupled with the transmission system. The final output member receives, from the second gear arrangement, the variable rotational power directed in the selected direction.

Other features and aspects of this disclosure will be apparent from the following description and the accompanying drawings.

BRIEF DESCRIPTION OF THE DRAWINGS

FIG. 4 is an exemplary table illustrating engagement of various clutches of the transmission system shown in FIG. 3 for forward and reverse movement of machine.

DETAILED DESCRIPTION

Figure 1:
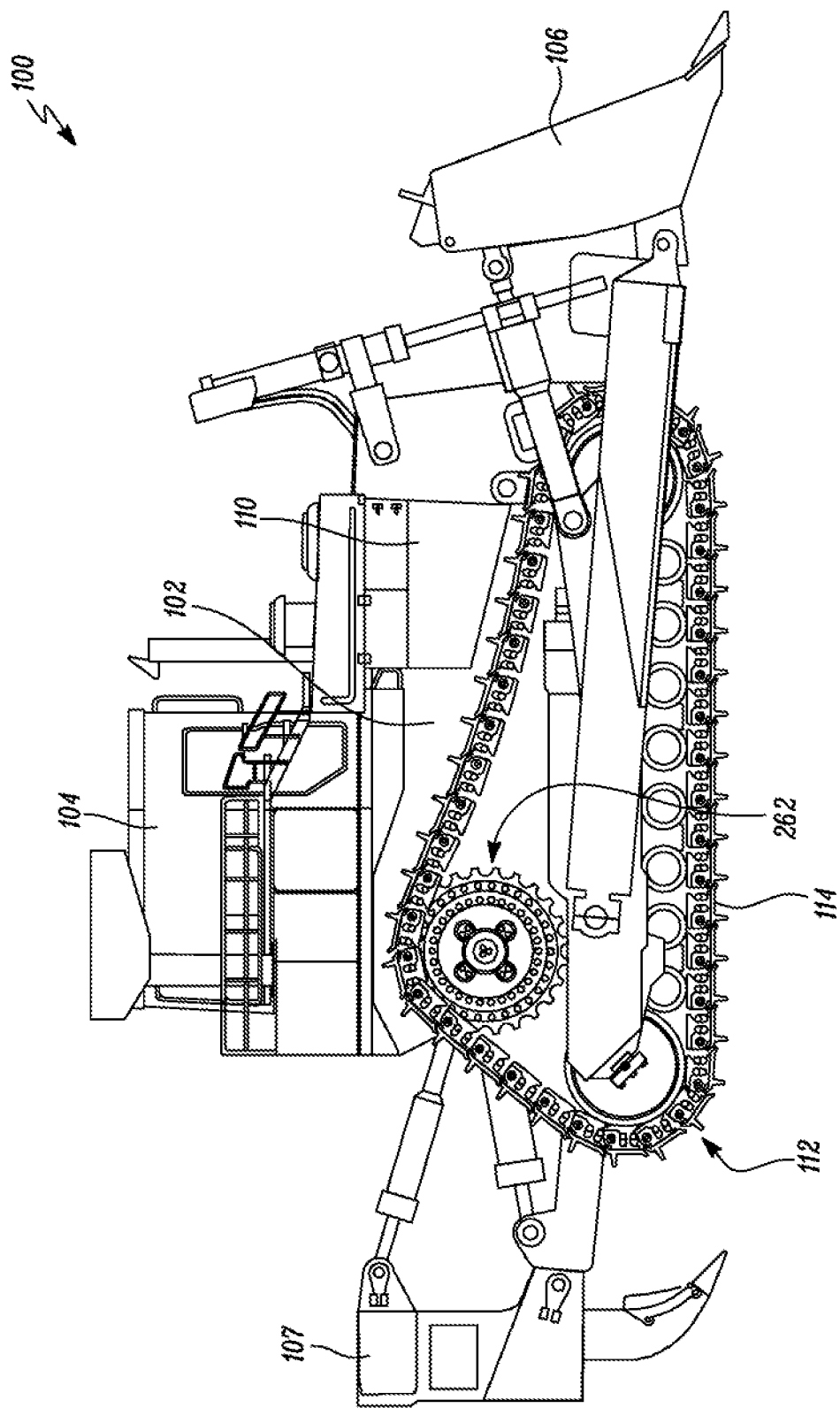
FIG. 1 is a side view of a machine, according to an embodiment of the present disclosure.

Reference numerals appearing in more than one figure indicate the same or corresponding parts in each of them. References to elements in the singular may also be construed to relate to the plural and vice-versa without limiting the scope of the disclosure to the exact number or type of such elements unless set forth explicitly in the appended claims.

FIG. 1 is a side view of a machine 100, according to an embodiment of the present disclosure. In the illustrated embodiment, the machine 100 is embodied as a track type tractor. In alternative embodiments, the machine 100 may include an excavator, a dozer, a harvester, or any other type of machine known in the art having tracks for movement on a ground surface. The machine 100 may perform one or more machine operations associated with an industry such as mining, construction, farming, transportation, or any other industry known in the art. The machine 100 may be embodied as a manual, autonomous, or semi-autonomous machine, without any limitations.

The machine 100 includes a main frame 102 that supports various machine components thereon. An operator cab 104 is mounted on the main frame 102. When the machine 100 is embodied as a manual or semi-autonomous machine, an operator of the machine 100 is seated within the operator cab 104 to perform one or more machine operations. The machine 100 also includes a work implement 106 coupled at a front end of the machine 100. The work implement 106 is embodied as a blade. Further, the machine 100 additionally includes another work implement 107, embodied as a ripper, coupled at a rear end of the machine 100.

The machine 100 also includes an engine 108 (shown in FIG. 3) that generates power. The engine 108 may be an internal combustion engine such as a compression ignition diesel engine, but in other embodiments, the engine 108 might include a gas turbine engine. The engine 108 is mounted on the main frame 102 for providing propulsion power to the machine 100. More particularly, the engine 108 is mounted within an enclosure 110 formed in the main frame 102. Further, the main frame 102 rotatably supports an undercarriage system 112. The undercarriage system 112 includes a pair of ground engaging members 114 each of which is embodied as a track in the illustrated embodiment of FIG. 1. The ground engaging members 114 rotate in order to propel the machine 100 on ground surfaces.

Figure 2:
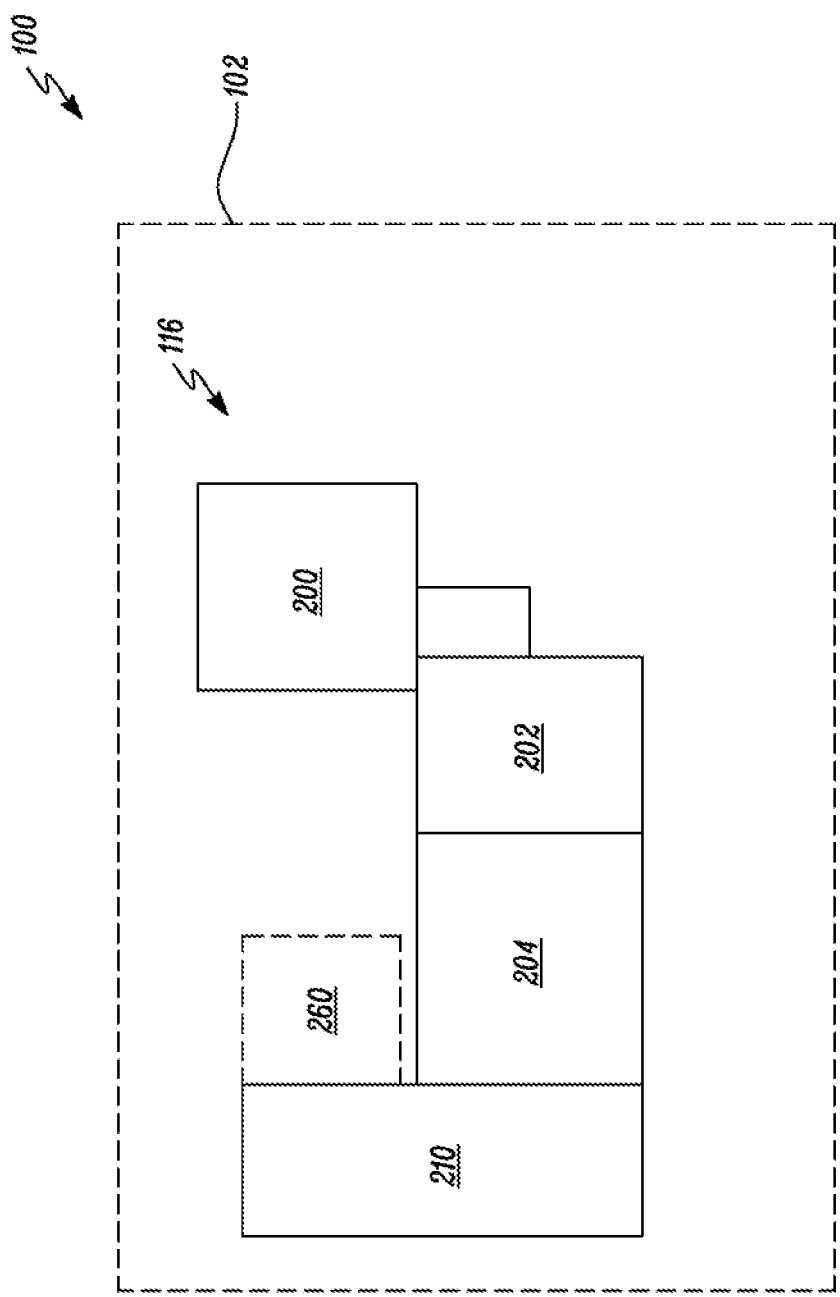
FIG. 2 is a block diagram of a transmission system associated with the machine of FIG. 1, in accordance with an embodiment of the present disclosure.

Referring now to FIG. 2, the machine 100 includes a transmission system 116. The transmission system 116 is embodied as a hydromechanical transmission system. The transmission system 116 is coupled with the engine 108 (see FIG. 3) that generates power. More particularly, the transmission system 116 is disposed between the engine 108 and the ground engaging members 114 (see FIG. 1) for adapting the power of the engine 108 to the ground engaging members 114. The transmission system 116 described herein is embodied as a modular transmission kit 116 that includes a variator 200, a first gear arrangement 202, a second gear arrangement 204, a first clutch assembly 206, a second clutch assembly 208, and an output module 210. The transmission system 116 may be hereinafter interchangeably referred to as the modular transmission kit 116.

Figure 3:
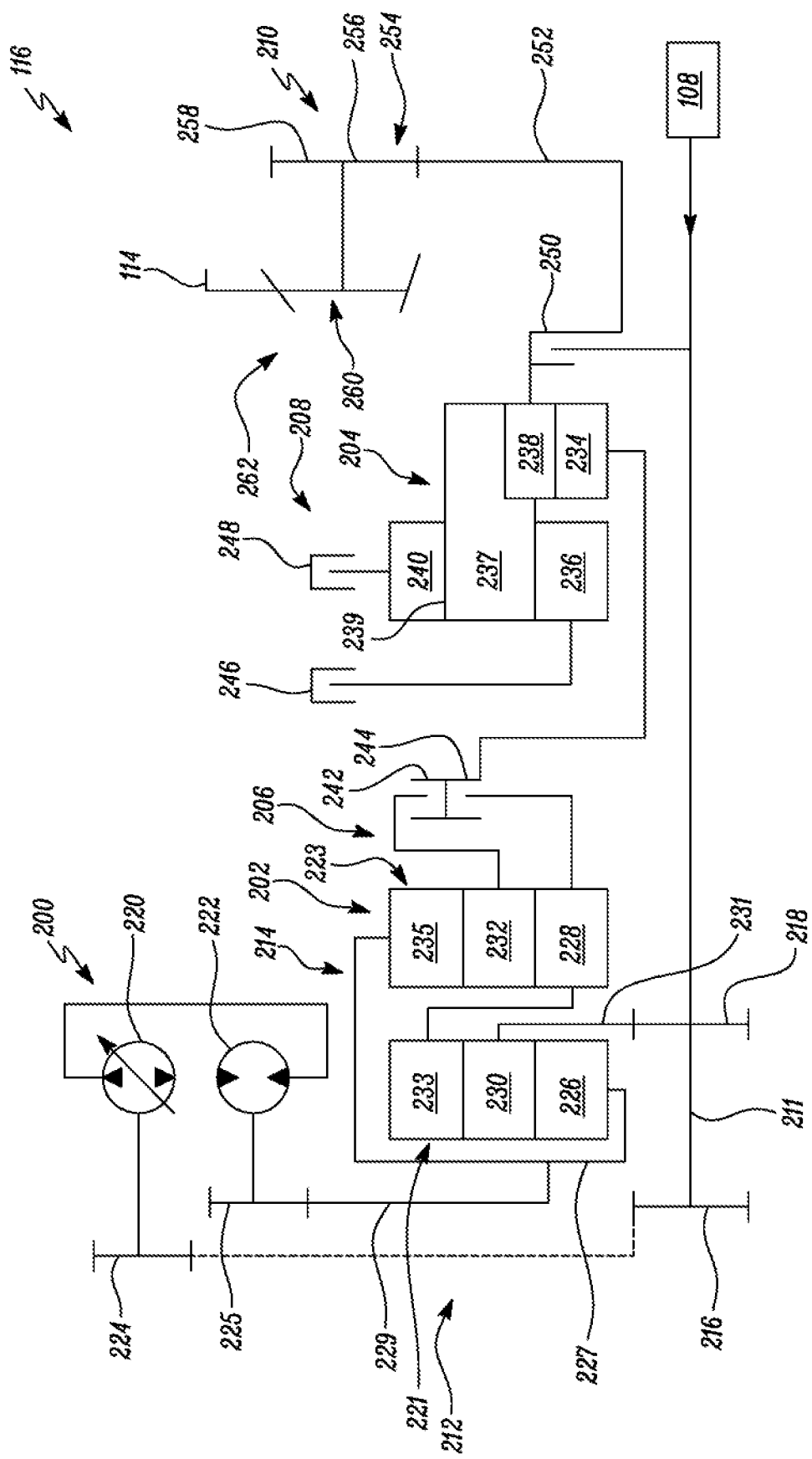
FIG. 3 is a schematic view of the transmission system shown in FIG. 2.

Referring to FIG. 3, the transmission system 116 is connected to the engine 108 via an input member 211. The input member 211 provides split power to a hydraulic power path 212 and a mechanical power path 214 through a first fixed input gear 216 and a second fixed input gear 218, respectively. Further, the transmission system 116 includes the hydraulic power path 212. The hydraulic power path 212 includes the variator 200 coupled to the engine 108. The variator 200 receives a portion of the power generated by the engine 108. In some examples, the variator 200 may receive approximately half of the power generated by the engine 108.

The variator 200 includes a variable displacement pump 220 and a fixed displacement motor 222. The pump 220 is fluidly interconnected with and arranged to operate the motor 222. The pump 220 is drivingly connected to the engine 108, through a hydrostatic transmission input gear 224 that engages with the first fixed input gear 216. The motor 222 outputs through a hydrostatic transmission output gear 225 that engages with an input member 227 to the first gear arrangement 202 by way of a connection member 229. Thus, the pump 220 of the transmission system 116 uses the split input power from the engine 108 to fluidly drive the motor 222 to convert the power received from the engine 108 to hydrostatic output power over a continuously variable speed ratio. The transmission of power through the engine 108, the first fixed input gear 216, the hydrostatic transmission input gear 224, the variator 200, and the hydrostatic transmission output gear 225 may be described as the hydraulic power path 212.

Further, the transmission system 116 includes the mechanical power path 214. The mechanical power path 214 includes the first gear arrangement 202. The first gear arrangement 202 includes a plurality of gears 226, 230, 233, 228, 232, 235. The first gear arrangement 202 is coupled with the variator 200 and the engine 108 and is operative to receive power from the variator 200 and the engine 108. Further, the first gear arrangement 202 is connected to the input member 211 to receive a portion of the power generated by the engine 108. In some examples, the first gear arrangement 202 may receive approximately half of the power generated by the engine 108. The input member 211 is connected to the first gear arrangement 202 via the second fixed input gear 218 and a connection member 231. It should be noted that the connection members 229, 231 may be embodied as gears.

The first gear arrangement 202 includes a first planetary gear arrangement 221. The first planetary gear arrangement 221 includes a first sun gear 226, a first planetary gear carrier 230, and a first ring gear 233. Further, the second planetary gear arrangement 223 includes a second sun gear 228, a second planetary gear carrier 232, and a second ring gear 235. It should be noted that the first sun gear 226 is connected with the second ring gear 235 by a splined connection. Further, the first ring gear 233 is connected with the second sun gear 228 by a splined connection. The first gear arrangement 202 determines torque/speed reduction from an input that combines the hydraulic and mechanical power paths 212, 214. More particularly, the first gear arrangement 202 combines the hydrostatic output power from the hydraulic power path 212 and the split input mechanical power from the mechanical power path 214 to provide hydromechanical power to the second gear arrangement 204. Thus, the first gear arrangement 202 provides a variable rotational power to the second gear arrangement 204.

Further, the mechanical power path 214 includes the second gear arrangement 204. The second gear arrangement 204 includes a plurality of gears 234, 236, 238, 239, 240. The second gear arrangement 204 is coupled with the first gear arrangement 202 to receive the variable rotational power from the first gear arrangement 202. The second gear arrangement 204 determines the direction of motion transmitted by the transmission system 116, that is, whether the transmission system 116 is in forward or reverse. More specifically, the second gear arrangement 204 directs the variable rotational power received from the first gear arrangement 202 towards the final output member 114 of the machine 100 in a selected direction. In the illustrated embodiment, the final output member 114 is the ground engaging member 114 of the machine 100. Accordingly, the final output member 114 may be hereinafter interchangeably referred to as the ground engaging member 114.

The second gear arrangement 204 includes a planetary gear arrangement. More particularly, the second gear arrangement 204 includes a first sun gear 234, a second sun gear 236, a planet carrier 237 that supports a first set of planet gears 238 and a second set of planet gears 239, and a ring gear 240. The first sun gear 234 engages with the first set of planet gears 238. Further, the second sun gear 236 engages with the second set of planet gears 239. While the first and second gear arrangement 202, 204 have been illustrated in a particular configuration herein, they may include any other configuration without any limitations.

The transmission system 116 also includes a first clutch assembly 206. More particularly, the first clutch assembly 206 includes a first clutch 242 and a second clutch 244. The first and second clutches 242, 244 may include conventionally known clutches including rotatable discs that may be selectively coupled to other rotatably mounted discs to transmit power from one rotatable member to another. The first clutch assembly 206 is selectively engagable to couple the first gear arrangement 202 and the second gear arrangement 204. In this way, the engagement of the gear 228 or the gear 232 of the first gear arrangement 202 with the first sun gear 234 of the second gear arrangement 204 determines the torque/speed reduction from the input that combines the hydraulic and mechanical power paths 212, 214.

The first gear arrangement 202 in conjunction with the selective engagement of the first clutch assembly 206 provides a speed reduction in a low gear range or a high gear range to the first sun gear 234 of the second gear arrangement 204. In this embodiment, an engagement of the first clutch 242 provides the low gear range, while an engagement of the second clutch 244 provides the high gear range. More particularly, when the first clutch 242 is engaged, the second planetary gear carrier 232 of the first gear arrangement 202 is coupled with the first sun gear 234 of the second gear arrangement 204 thereby providing the low gear range.

Further, when the second clutch 244 is engaged, the second sun gear 228 of the first gear arrangement 202 is coupled with the first sun gear 234 of the second gear arrangement 204 thereby providing the high gear range. In an example, the first clutch assembly 206 may be packaged in conjunction with the first gear arrangement 202.

The transmission system 116 also includes a second clutch assembly 208. More particularly, the second clutch assembly 208 includes a third clutch 246 and a fourth clutch 248. The third and fourth clutches 246, 248 may include conventionally known stationary clutches, also known as brakes, that affects a direction of power output from the second gear arrangement 204. Further, the second clutch assembly 208 is selectively engagable with the gear 236 or the gear 240 of the second gear arrangement 204. More particularly, the third or fourth clutches 246, 248 may be selectively engaged with the gear 236 or the gear 240, respectively, of the second gear arrangement 204 to determine the direction of power output from the second gear arrangement 204 to the output module 210.

The selective engagement of the second clutch assembly 208 provides a forward gear range or a reverse gear range. In this embodiment, an engagement of the third clutch 246 provides the forward gear range, while an engagement of the fourth clutch 248 provides a reverse gear range. Further, the transmission system 116 also includes a fifth clutch 250. In the illustrated embodiment, the engagement of the fifth clutch 250 provides the auxiliary gear range. The fifth clutch 250 may be selectively engaged to couple the input member 211 with the output member 252. In an example, the second clutch assembly 208 may be packaged in conjunction with the second gear arrangement 204, whereas the fifth clutch 250 may be disposed separate from the clutch assemblies 206, 208.

The engagement or disengagement of the clutch assemblies 204, 206 and the fifth clutch 250 provides three forward gear ranges and two reverse gear ranges. As shown in FIG. 4, for a low-forward gear range operation, the first and third clutches 242, 246 are engaged whereas the clutches 244, 248, 250 are disengaged. Further, for a low-reverse gear range operation, the first and fourth clutches 242, 248 are engaged whereas the clutches 244, 246, 250 are disengaged. Additionally, for a high-forward gear range operation, the second and third clutches 244, 246 are engaged whereas the clutches 242, 248, 250 are disengaged. Whereas, for a high-reverse gear range operation, the second and fourth clutches 244, 248 are engaged whereas the clutches 242, 246, 250 are disengaged. Moreover, for the auxiliary gear range, the second and fifth clutches are engaged 242, 250 whereas the clutches 242, 246, 248 are disengaged.

The transmission system 116 also includes the output module 210. The output module 210 is disposed between the second gear arrangement 204 and the final output member 114. The output module 210 is coupled with the second gear arrangement 204. The output module 210 receives the variable rotational power directed in the selected direction from the second gear arrangement 204. More particularly, the output module 210 adapts the variable rotational power that is directed in the selected direction to the final output member 114 of the machine 100. It should be noted that the output module 210 is selected to adapt the output of the second gear arrangement 204 based on a configuration of the machine 100. For example, dimensions of components of the output module 210 and an arrangement of the output module 210 may be varied based on a configuration of the machine 100. The output module 210 is connected to the second gear arrangement 204 by an output member 252.

In the illustrated embodiment, the output module 210 includes an output transfer gear arrangement 254. The output transfer gear arrangement 254 may be designed to adapt an output provided by the output member 252 to a particular application. The output transfer gear arrangement 254 includes a first output gear 256 and a second output gear 258. In the illustrated embodiment, the output member 252 provides rotation to the first output gear 256 that engages with the second output gear 258. Further, the first and second output gears 256, 258 intermesh a bevel gear 260 associated with a final drive arrangement 262 of the machine 100. The bevel gear 260 in turn engages with the final output member 114 to rotate the final output member 114 at desired speeds and directions.

It should be noted that the output module 210 may be alternatively designed to facilitate adaptation of the output of the second gear arrangement 204 for specific applications. For example, fewer or additional structures may be provided, sizes, numbers, configuration and gear ratios of the gears may also be varied.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

An operation of the transmission system 116 will now be explained in relation to FIG. 3. Power generated by the engine 108 is delivered to the first gear arrangement 202, via the hydraulic and mechanical power paths 212, 214. More specifically, rotation of the input member 211 provides power through the first fixed input gear 216 and the hydrostatic transmission input gear 224 to the variator 200. The variator 200 provides power through the hydrostatic transmission output gear 225 to the input member 227, via the connection member 229. The connection member 229 is in turn coupled to the first sun gear 226 of the first gear arrangement 202. Rotation of the input member 211 by the engine 108 likewise provides power through the second fixed input gear 218 and the connection member 231 to the first planetary gear carrier 230 of the first gear arrangement 202.

Further, power from the first gear arrangement 202 is transmitted to the second gear arrangement 204 based upon selective engagement or disengagement of the first clutch assembly 206. In the illustrated embodiment, the first and second clutch assemblies 206, 208 may be selectively engaged or disengaged to provide a low-forward gear range, a high-forward gear range, a low-reverse gear range, and a high-reverse gear range. Further, the fifth clutch 250 may be selectively engaged or disengaged to provide the auxiliary gear range. More particularly, engagement of the first clutch 242 provides the low gear range, while engagement of the second clutch 244 provides the high gear range. The low and high gear ranges may be coupled with designation of the forward or reverse gear ranges based on engagement of the second clutch assembly 208. Further, the auxiliary gear range may be provided by the engagement of second clutch 244 and the fifth clutch 250. The selective engagement of the clutches 242, 244, 246, 248, 250 for each gear range is illustrated in FIG. 4.

Referring to FIG. 4, the first clutch 242 and the third clutch 246 are engaged to provide the low-forward gear range operation. Accordingly, the rotation of the second planetary gear carrier 232 of the first gear arrangement 202 is transmitted by way of the first clutch 242 to the first sun gear 234 of the second gear arrangement 204. With the engagement of the third clutch 246, the second sun gear 236 is held stationary. Power is further transmitted by the planet carrier 237 of the second gear arrangement 204 to the final output member 114 in the forward direction, via the output module 210. However, when the first and fourth clutches 242, 248 are engaged, the ring gear 240 is held stationary. As a result, the low gear range is provided to the final output member 114 in the reverse direction.

Further, the second and third clutches 244, 246 are engaged to provide the high-forward gear operation. More particularly, when the second clutch 244 is engaged, the high gear range is obtained. Accordingly, the rotation of the second sun gear 228 of the first gear arrangement 202 is transmitted by way of the second clutch 244 to the first sun gear 234 of the second gear arrangement 204. Further, with the engagement of the third clutch 246, the second sun gear 236 is held stationary. Power is further transmitted by the planet carrier 237 of the second gear arrangement 204 to the final output member 114 in the forward direction, via the output module 210. Further, when the fourth clutch 248 is engaged, the high gear range is provided in the reverse direction. More particularly, when the second and fourth clutches 244, 248 are engaged, the ring gear 240 is held stationary. As a result, the high gear range is provided to the final output member 114 in the reverse direction.

The second gear arrangement 204 may additionally provide the auxiliary gear range to the final output member 114. In the auxiliary gear range, the second clutch 244 and the fifth clutch 250 are engaged. As a result, power from the first gear arrangement 202 is transmitted by way of the second sun gear 228 of the first gear arrangement 202 to the first sun gear 234 of the second gear arrangement 204. Further, this rotation is likewise transmitted by the planet carrier 237 of the second gear arrangement 204 to the final output member 114 in the forward direction, via the output module 210.

As the first gear arrangement 202 provides motion to the transmission system 116 and the second gear arrangement 204 determines the range, the transmission system 116 may not require synchronizers, which are susceptible to damage during a synchronization process if a relative speed at the start of the synchronization process is high. Additionally, the variator 200 of the transmission system 116 includes the variable displacement pump 220 and the fixed displacement motor 222 which decreases complexity and is cost effective.

Further, as the first gear arrangement 202 provides motion to the transmission system 116, the second gear arrangement 204 determines the range, and the output module 210 couples the transmission system 116 to the final output member 114, standardized gear arrangements may be utilized for a number of applications by including the output module 210 tailored to the particular application. Thus, the transmission system 116 can be easily retrofitted in existing machines without making any major changes to the machine 100. Further, the transmission system 116 includes a compact and robust L-shaped arrangement which allows easy accommodation of the transmission system 116 in a compact space, such as in machines having space limitations. Further, the transmission system 116 is packaged as a kit that allows easy replacement of the transmission system 116 during servicing or replacement schedules.

The transmission system 116 described herein is simple in design and operation and is cost effective. Further, the transmission system 116 improves fuel efficiency of the machine 100. Moreover, the second gear arrangement 204 of the transmission system 116 includes fewer components thereby decreasing an overall cost and complexity of the transmission system 116. Additionally, the transmission system 116 described herein is durable and provides improved reliability.

While aspects of the present disclosure have been particularly shown and described with reference to the embodiments above, it will be understood by those skilled in the art that various additional embodiments may be contemplated by the modification of the disclosed machines, systems, methods and processes without departing from the spirit and scope of what is disclosed. Such embodiments should be understood to fall within the scope of the present disclosure as determined based upon the claims and any equivalents thereof.

What is claimed is:

1. A transmission system for a machine, wherein the transmission system is coupled to an engine of the machine that is adapted to generate power, the transmission system comprising:
    a hydraulic power path including a variator coupled to the engine via an input member, wherein the variator receives a portion of the power generated by the engine;
    a mechanical power path including:
        a first gear arrangement including a plurality of gears, wherein the first gear arrangement is coupled with the variator via a connection member and coupled with the engine via the input member, and the first gear arrangement is operative to receive power from the variator and the engine;
        a second gear arrangement including a plurality of gears, wherein the second gear arrangement is selectively engageable with the first gear arrangement via a first clutch assembly to transfer a variable rotational power from the first gear arrangement to the second gear arrangement;
        a second clutch assembly being selectively engageable with at least one gear of the second gear arrangement to set a direction of rotation of the second gear arrangement to a selected direction;
    an output module coupled to the second gear arrangement via an output member; and
    a third clutch assembly operatively coupled to the output member and the input member, the output member being selectively engageable with the input member via the third clutch assembly.

2. The transmission system of claim 1, wherein the output module is selected to adapt an output of the second gear arrangement to a selected platform.

3. The transmission system of claim 1, wherein the variator includes a variable displacement pump and a fixed displacement motor.

4. The transmission system of claim 1, wherein the first gear arrangement includes a planetary gear arrangement.

5. The transmission system of claim 1, wherein the second gear arrangement includes a planetary gear arrangement.

6. The transmission system of claim 1, wherein the first gear arrangement, in conjunction with the selective engagement of the first clutch assembly, provides a speed reduction in at least one of a high gear range and a low gear range to at least one gear of the second gear arrangement.

7. The transmission system of claim 1, wherein the selective engagement of the second clutch assembly provides at least one of a forward gear range and a reverse gear range.

8. The transmission system of claim 4, wherein the planetary gear arrangement of the first gear arrangement is a first planetary gear arrangement having a first sun gear and a first ring gear,
    the first gear arrangement further includes a second planetary gear arrangement having a second sun gear and a second ring gear, and
    the first ring gear is directly coupled to the second sun gear.

9. A modular transmission kit for a machine, wherein the modular transmission kit is configured to be coupled to an engine of the machine that is adapted to generate power, the modular transmission kit comprising:
    an input member that is configured to be coupled to the engine for transmission of shaft power therebetween;
    a variator coupled to the input member, wherein the variator receives a portion of the power from the input member;
    a first gear arrangement including a plurality of gears, wherein the first gear arrangement is coupled with the variator via a connection member and coupled with the input member, and the first gear arrangement is operative to receive power from the variator and the input member;
    a second gear arrangement including a plurality of gears, wherein the second gear arrangement is selectively engageable with the first gear arrangement via a first clutch assembly to transfer a variable rotational power from the first gear arrangement to the second gear arrangement;
    a second clutch assembly being selectively engageable with at least one gear of the second gear arrangement to set a direction of rotation of the second gear arrangement to a selected direction;
    an output module coupled with the second gear arrangement, wherein the output module receives, from the second gear arrangement, the variable rotational power directed in the selected direction, the output module being configured to adapt the variable rotational power directed in the selected direction to an output member of the machine; and
    a third clutch assembly operatively coupled to the output member and the input member, the output member being selectively engageable with the input member via the third clutch assembly.

10. The modular transmission kit of claim 9, wherein the output module is selected to adapt an output of the second gear arrangement to a selected platform.

11. The modular transmission kit of claim 9, wherein the variator includes a variable displacement pump and a fixed displacement motor.

12. The modular transmission kit of claim 9, wherein the first gear arrangement includes a planetary gear arrangement.

13. The modular transmission kit of claim 9, wherein the second gear arrangement includes a planetary gear arrangement.

14. The modular transmission kit of claim 9, wherein the first gear arrangement in conjunction with the selective engagement of the first clutch assembly provides a speed reduction in at least one of a high gear range and a low gear range to at least one gear of the second gear arrangement.

15. The modular transmission kit of claim 9, wherein the selective engagement of the second clutch assembly provides at least one of a forward gear range and a reverse gear range.

16. A machine comprising:
an engine adapted to generate power; and
a transmission system coupled with the engine, the transmission system comprising:
    a hydraulic power path including a variator coupled to the engine via an input member, wherein the variator receives a portion of the power generated by the engine; and
    a mechanical power path including:
        a first gear arrangement including a plurality of gears, wherein the first gear arrangement is coupled with the variator via a connection member and coupled with the engine via the input member, and the first gear arrangement is operative to receive power from the variator and the engine;
        a second gear arrangement including a plurality of gears, wherein the second gear arrangement is selectively engageable with the first gear arrangement via a first clutch assembly to transfer a variable rotational power from the first gear arrangement to the second gear arrangement, the second gear arrangement being configured to direct the variable rotational power in a selected direction;
        a second clutch assembly being selectively engageable with at least one gear of the second gear arrangement to set a direction of rotation of the second gear arrangement to the selected direction;
        an output module coupled to the second gear arrangement via an output member; and
        a third clutch assembly operatively coupled to the output member and the input member, the output member being selectively engageable with the input member via the third clutch assembly.

17. The machine of claim 16, wherein the variator includes a variable displacement pump and a fixed displacement motor.

18. The machine of claim 16, wherein the first gear arrangement includes a planetary gear arrangement.

19. The machine of claim 16, wherein the second gear arrangement includes a planetary gear arrangement.

20. The machine of claim 18, wherein the planetary gear arrangement of the first gear arrangement is a first planetary gear arrangement having a first sun gear and a first ring gear,
    the first gear arrangement further includes a second planetary gear arrangement having a second sun gear and a second ring gear, and
    the first ring gear is directly coupled to the second sun gear.

* * * * *